Dec. 16, 1930.  A. F. JENKINS  1,784,964
CUTTING AND WELDING TORCh
Filed Sept. 7, 1928
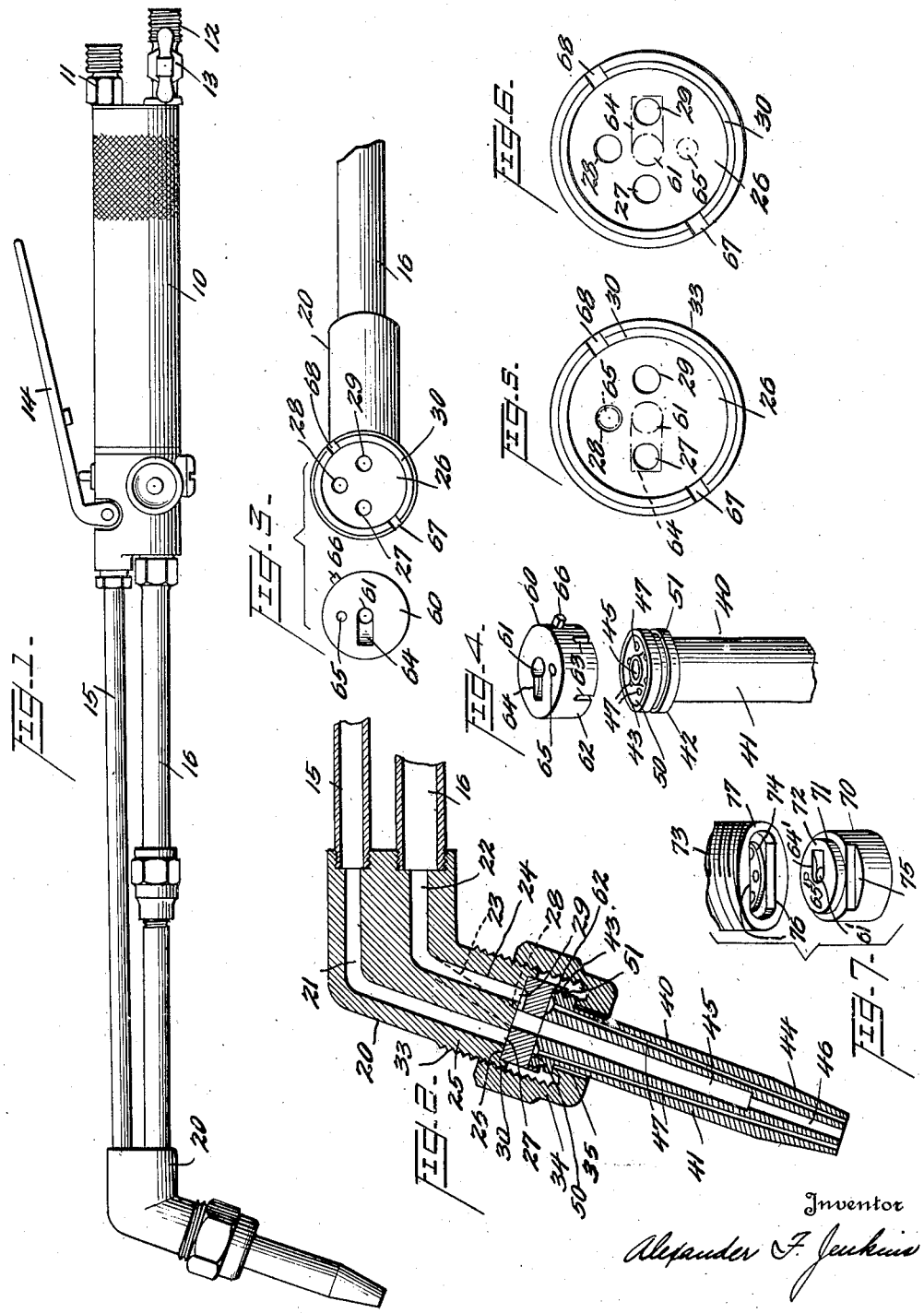
Inventor
Alexander F. Jenkins
By Watson, Coit, Morse & Grindle
Attorneys Patented Dec. 16, 1930

1,784,964

UNITED STATES PATENT OFFICE

ALEXANDER F. JENKINS, OF BALTIMORE, MARYLAND

CUTTING AND WELDING TORCH

Application filed September 7, 1928. Serial No. 304,531.

This invention relates to cutting and welding torches, and more particularly to devices of this character which are so constructed that the same torch may be adapted alternately for cutting or welding by a simple rearrangement of the parts.

According to the present invention, a member is interposed between the torch head and the tip and adapted to be held therebetween in a plurality of different positions. In one position the member serves to adapt the torch for cutting purposes and in another position it adapts the torch for welding.

The general object of the present invention is to simplify and improve the construction and operation of combination cutting and welding torches, so as to reduce the cost of manufacture and to provide easy manipulation to effect the change from cutting to welding and vice versa.

An important advantage is that a standard cutting tip may be used for both cutting and welding purposes—the central passage which ordinarily takes the cutting oxygen serving, when this type of tip is utilized in combination with the other members which make up the improved torch, as either a channel for cutting oxygen or combustible gases.

Other objects and features of novelty will be apparent as the following description proceeds, as taken in connection with the accompanying drawings in which one specific embodiment of the invention is illustrated by way of example. It will, of course, be understood that the invention is not limited to the details disclosed, but includes such embodiments of the broad idea as come within the scope of the claims.

The shape of the embodiment illustrated is such that it may be most conveniently shown by views readable from the side of the drawing, and the drawings have been prepared accordingly.

Figure 1 is an elevation of the entire torch to which my invention is applied;

Figure 2 is a cross section through the torch head and tip;

Figure 3 is a face view of the torch head and the converter, shown side by side for comparison;

Figure 4 is an exploded view of the torch tip and the converter;

Figure 5 is an enlarged view of the face of the torch head, showing the converter applied thereto to adapt the torch for cutting;

Figure 6 is a similar view, showing the converter in position to adapt the torch for welding; and Figure 7 is an exploded view of a modified arrangement in lieu of that shown in Fig. 3.

Referring more particularly to the drawings, the torch shown in Fig. 1 is illustrated as a type now in general use on the market and which forms no part of the present invention other than in combination with the structure to be later described.

The torch in general comprises a cylindrical handle 10 having at one end a coupling 11 adapted to receive a flexible hose supplying oxygen under comparatively high pressure, and a coupling 12 adapted to receive a flexible hose for supplying a combustible gas such as acetylene, hydrogen, butane, city gas, etc. This coupling is provided with a cut-off valve indicated generally at 13.

The oxygen introduced at 11 passes through passages, not shown, so that a part of the oxygen is transmitted to the tube 15 under the control of the operating lever 14, and another portion is mixed with the gas introduced at 12, and the mixture is conducted to the tube 16. The tubes 15 and 16 terminate in a casting, indicated generally at 20, and hereinafter referred to as the torch head.

Referring more particularly to Fig. 2, the oxygen tube 15 communicates with a passage 21 which passes entirely through the torch head, and the mixed gas tube 16 is in communication with a gas passage 22. The passage 22 is bifurcated, forming two passages 23 and 24 respectively.

As shown in Fig. 1, the torch head comprises an angular casting constructed so as to direct the flame against the work at a convenient angle. The passages through the head have substantially the same angular disposition, but this is not essential. The torch head is provided with a cylindrical portion 25 which terminates in a flat face 26. The passage 21 passing through the face 26 forms an aperture 27, and the gas passages 23 and 24 passing through the face form the apertures 28 and 29 respectively.

An annular flange 30 surrounds the face 26, and the cylindrical portion 25 is threaded as at 33 to receive a threaded collar 34. The collar 34 has a central aperture 35 through which passes the torch tip indicated generally at 40.

The torch tip 40, as indicated in Figs. 2 and 4, comprises a body 41 of a diameter to pass through the aperture 35, a tapered end portion 44, and a head 42 of slightly larger diameter terminating in a flat face 43. The tip is centrally bored from the head end to substantially the beginning of the tapered portion to form a passage 45. A smaller bore 46 is drilled from the opposite end to communicate with the passage 45. Disposed in an annular ring about the passage 45 are a plurality of smaller passages 47, all of which are eccentrically disposed, and preferably equidistantly spaced and converging toward the central passage 45.

The tip as above described constitutes a cutting tip, and to adapt this cutting tip to either cutting or welding is one of the features of the present invention.

The face 43 is provided with an annular groove 50 in communication with each of the passages 47, and the periphery of the head 42 is provided with a central groove 51.

Means is provided for introduction between the torch head and the tip to adapt the tip for either cutting or welding, and in the form of the invention illustrated, this means comprises a plug or cap indicated generally at 60 and hereinafter called the converter.

The converter comprises essentially a cylindrical member of slightly larger diameter than the head 42, and is provided with a central bore 61 preferably of the same diameter as the central passage 45 in the torch tip. The converter is preferably provided with an annular flange 62 which is adapted to fit over the head 42 so that the end of the flange 62 will ride in the groove 51. It is desirable to slot the flange 62 as at 63 so that the flange may be slightly crimped to hold its edges in the groove 51. The amount of crimping is intended to be such as will permit the converter to be removed from the head, or to permit it to be rotated with respect to the head 42, but such as will not permit the converter to readily drop off of the head 42.

The upper face of the converter is provided with a groove 64 extending radially from the passage 61 and adapted to communicate with the apertures in the torch head. A small bore 65 also passes through the converter, parallel to the passage 61 but eccentric thereto. A pin 66 extending radially from the converter 60 is adapted to engage either the slot 67 or 68 in the flange 30 when the parts are assembled as shown in Fig. 2.

In lieu of the pin and slot arrangement of Fig. 5 just described, the arrangement shown in Fig. 7 may be employed. The converter 70 has an annular groove 71 forming a central projection 72 adapted to fit a corresponding recess 74 in the torch head 73. Below the groove 71, the converter is slabbed off, or cut away, leaving shoulders 75 adapted to fit corresponding shoulders 76 formed in the flange 77 of the torch head. These shoulders are equivalents of the pin and slot connection 66—68, and permit the converter to be secured in selected positions with respect to the torch head in the same manner. The converter 70 has a passage 61', a groove 64' and a bore 65' which are identical with those described for the converter 60.

When the converter is in the position shown in Fig. 5, the groove 64 will overlie the aperture 27 which receives the high pressure oxygen, and the groove 64 will conduct the oxygen to the central bore 61 in the converter, which, being in register with the passage 45 in the tip, will permit high pressure oxygen to be directed from the passage 46. At the same time the eccentric bore 65 will be in register with the aperture 28, which receives the mixed gas from the passage 23. The passage 65 therefore conducts the mixture to the groove 50 from which the mixed gas will pass through the eccentric passages 47 and be directed from the tip. In this position of the converter the aperture 29 is closed by the flat face of the converter.

When the converter is in the position shown in Fig. 6, the groove 64 will overlie the aperture 29 so that mixed gas from the passage 24 may pass through the central bore 61 of the converter and so through the passages 45 and 46 to be directed from the tip. In this position the flat face of the converter overlies both orifices 27 and 28 and the bore 65 overlies the flat face 26 of the torch head. Hence in this position the only flow will be that of mixed gas from the passage 24 through the converter to the central passage 45 of the tip.

It should be noted that the converter 60 may be very inexpensively manufactured, and yet will be quite efficient for the purposes desired. In the event of damage due to any cause, this member may be readily and cheaply replaced.

Having thus described the invention, what is claimed as new and desired to be secured by Letters Patent is:

1. The combination with a torch head and tip, each having a plurality of gas passages therein, of means adapted to be interposed between the head and tip whereby communication may be established between one passage in the tip and either of two passages in the head.

2. The combination with a torch head having ports for the delivery of oxygen and combustible gases and a tip having a passage which may serve as a conduit for either oxygen or combustible gases, of means adapted to be interposed between the head and tip whereby communication may be established between the said passage in the tip and either an oxygen delivery port or a combustible gas delivery port, of the head.

3. In a combined cutting and welding torch, a tip having a central passage, a head having a plurality of ports offset from the central passage of the tip, and a member which may be interposed between head and tip and by means of which the central passage of the tip may be brought into communication with either of two ports in the head.

4. In a combined cutting and welding torch, a tip having two passages, a head having a plurality of ports, a member associated with both head and tip and having two passages therethrough, said member being adjustable to bring each passage in the tip into communication with a port in the head or to bring only one passage in the tip into communication with a port in the head and to block off communication between the second passage in the tip and the gas delivery ports of the head.

5. In a combined cutting and welding torch, a tip having two passages, a head having three ports, a member having two passages therethrough by means of which one passage in the tip may be brought into communication with either of two ports in the head and the second passage in the tip may be brought into communication with a port in the head or blocked off therefrom, at the will of the operator.

6. The combination with a torch head and a cutting tip each having a plurality of gas passages formed therein, of means adapted to be positioned intermediate the head and tip whereby communication may be established between one of the passages in the tip and either of two passages in the head.

7. In a combined cutting and welding torch, the combination with a torch head and a tip each having passages for cutting oxygen and for preheating gas or gases, of means interposed between said head and tip for establishing communication between the respective preheating gas passages, and for cutting off communication between the respective cutting oxygen passages.

8. A cutting and welding torch comprising in combination a torch head and a tip each having passages for preheating gas or gases and cutting oxygen, and a separate member interposed between said torch head and tip and adapted to be selectively fixed in a plurality of different positions, said member having passages therethrough adapted in one position of said member to establish communication between the preheating gas passages in said head and the cutting oxygen passage in said tip to adapt the torch for welding purposes.

9. A cutting and welding torch comprising in combination a torch head and a tip each having respective passages for preheating gas or gases and cutting oxygen, and a separate member interposed between said torch head and tip and adapted to be selectively fixed in a plurality of different positions, said member having passages therethrough adapted in one position of said member to establish communication between the cutting oxygen passage in said head and the cutting oxygen passage in said tip to adapt the torch for cutting purposes.

10. A cutting and welding torch comprising in combination a torch head and a tip each having respective passages for preheating gas or gases and cutting oxygen, and a separate member interposed between said torch head and tip and adapted to be selectively fixed in a plurality of different positions, said member having passages therethrough adapted in one position of said member to establish communication between the preheating gas passage in said head and the cutting oxygen passage in said tip to adapt the torch for welding purposes, said member being adapted in another position to establish communication between the cutting oxygen passage in said head and the cutting oxygen passage in said tip to adapt the torch for cutting purposes.

11. In a combined cutting and welding torch, the combination with a torch head having passages therein for cutting oxygen and for preheating gas or gases, of means whereby said torch is readily changeable from a welding torch to a cutting torch or vice versa, said means including a tip and a separate member adapted to be mounted between said tip and said head in any one of a plurality of different positions, the cutting oxygen passage of said head being closable by said member in one of said positions and open in another of said positions, which renders the device either a welding torch or a cutting torch as desired.

12. In a combined cutting and welding torch, the combination with a torch head having passages therein for cutting oxygen and for preheating gas or gases, of means whereby said torch is readily changeable from a welding torch to a cutting torch or vice versa, said means including a tip and a separate member adapted to be mounted between said tip and said head in any one of a plurality of different positions, the cutting oxygen passage of said head being closable by said member in one of said positions and open in another of said positions, which renders the device either a welding torch or a cutting torch as desired, said member being adapted to permit passage of preheating gas from said torch head to said tip in either of said positions.

13. In a cutting and welding torch, the combination with a torch head having passages therein for cutting oxygen and preheating gas or gases, and a tip having a central passage and a plurality of other passages, of means for converting said torch from a cutting to a welding torch, or vice versa, comprising a member selectively adjustable to rotated positions with respect to said tip.

14. In a cutting and welding torch, the combination with a torch head having passages therein for cutting oxygen and preheating gas or gases, and a tip having a central passage and a plurality of other passages, of means for converting said torch from a cutting to a welding torch, or vice versa, comprising solely a member clamped against the inner end of said tip.

15. In a cutting and welding torch, the combination with a torch head having passages therein for cutting oxygen and preheating gas or gases, and a tip having a central passage and a plurality of other passages, of means for converting said torch from a cutting to a welding torch, or vice versa, comprising solely a member interchangeably mounted with respect to said tip.

16. In a combined cutting and welding torch, in combination, a torch head having passages therethrough for preheating gas or gases and cutting oxygen, said head having a face with eccentrically arranged apertures in which said passages terminate, a tip having an axial bore, and a plurality of eccentric bores surrounding said axial bore, the combination of means interposed between said face and the inner end of said tip for adapting said torch for either cutting or welding as desired.

17. In a combined cutting and welding torch, in combination, a torch head having passages therethrough for preheating gas or gases and cutting oxygen, said head having a face with eccentrically arranged apertures in which said passages terminate, a tip having an axial bore, and a plurality of eccentric bores surrounding said axial bore, the combination of means interposed between said face and the inner end of said tip for adapting said torch for either cutting or welding as desired, said means comprising a cylindrical plug having a central bore always in register with said axial bore of said tip.

18. In a combined cutting and welding torch, in combination, a torch head having passages therethrough for preheating gas or gases and cutting oxygen, said head having a face with eccentrically arranged apertures in which said passages terminate, a tip having an axial bore, and a plurality of eccentric bores surrounding said axial bore, the combination of means interposed between said face and the inner end of said tip for adapting said torch for either cutting or welding as desired, said means comprising a cylindrical plug having a central bore always in register with said axial bore of said tip, and having a groove in the face of said plug which contacts with the face of said head, said groove extending radially from said central bore and adapted to communicate with one of said head apertures.

19. In a combined cutting and welding torch, in combination, a torch head having passages therethrough for preheating gas or gases and cutting oxygen, said head having a face with eccentrically arranged apertures in which said passages terminate, a tip having an axial bore, and a plurality of eccentric bores surrounding said axial bore, the combination of means interposed between said face and the inner end of said tip for adapting said torch for either cutting or welding as desired, said means comprising a cylindrical plug having a central bore always in register with said axial bore of said tip, and an eccentric bore adapted in one position of said plug to communicate with one of said head apertures, and in another position to lie therebetween.

20. An article of manufacture, comprising a cylindrical member having a central bore and an eccentric bore spaced therefrom, and a groove in one face of said member extending radially from said central bore, and an annular flange projecting from its other face.

21. An article of manufacture, comprising a cylindrical member having a central bore and an eccentric bore spaced therefrom, and a groove in one face of said member extending radially from said central bore, one side of said member having its cylindrical surface deformed to engage an abutment.

In testimony whereof I hereunto affix my signature.

ALEXANDER F. JENKINS.